H. W. SCHATZ & A. M. SOSA.
DRILLING MACHINE.
APPLICATION FILED SEPT. 10, 1917.

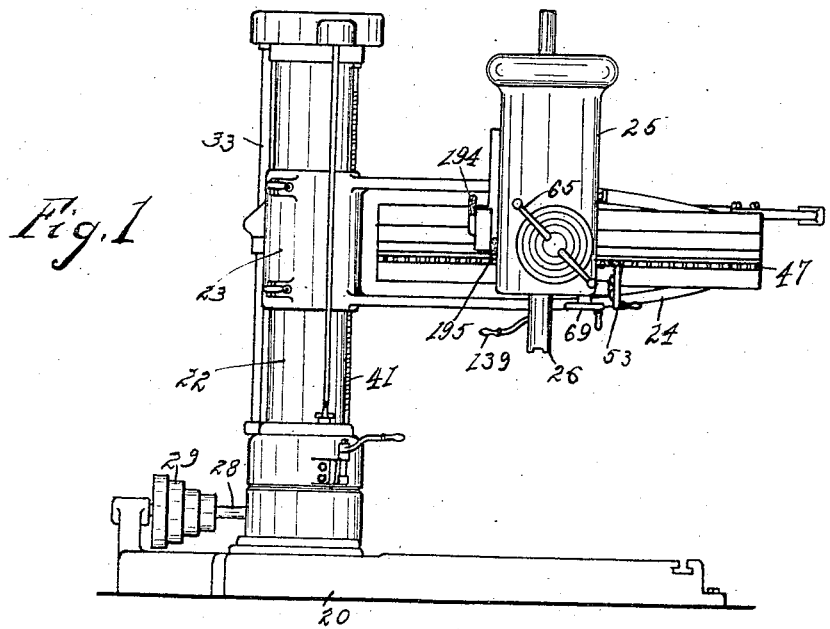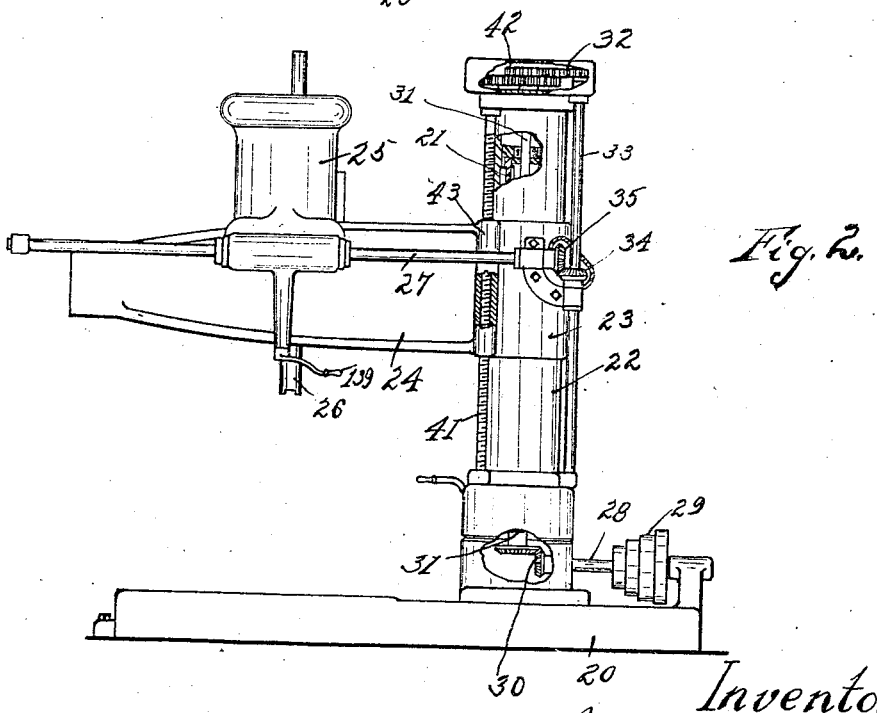

1,297,256.

Patented Mar. 11, 1919.
6 SHEETS—SHEET 2.

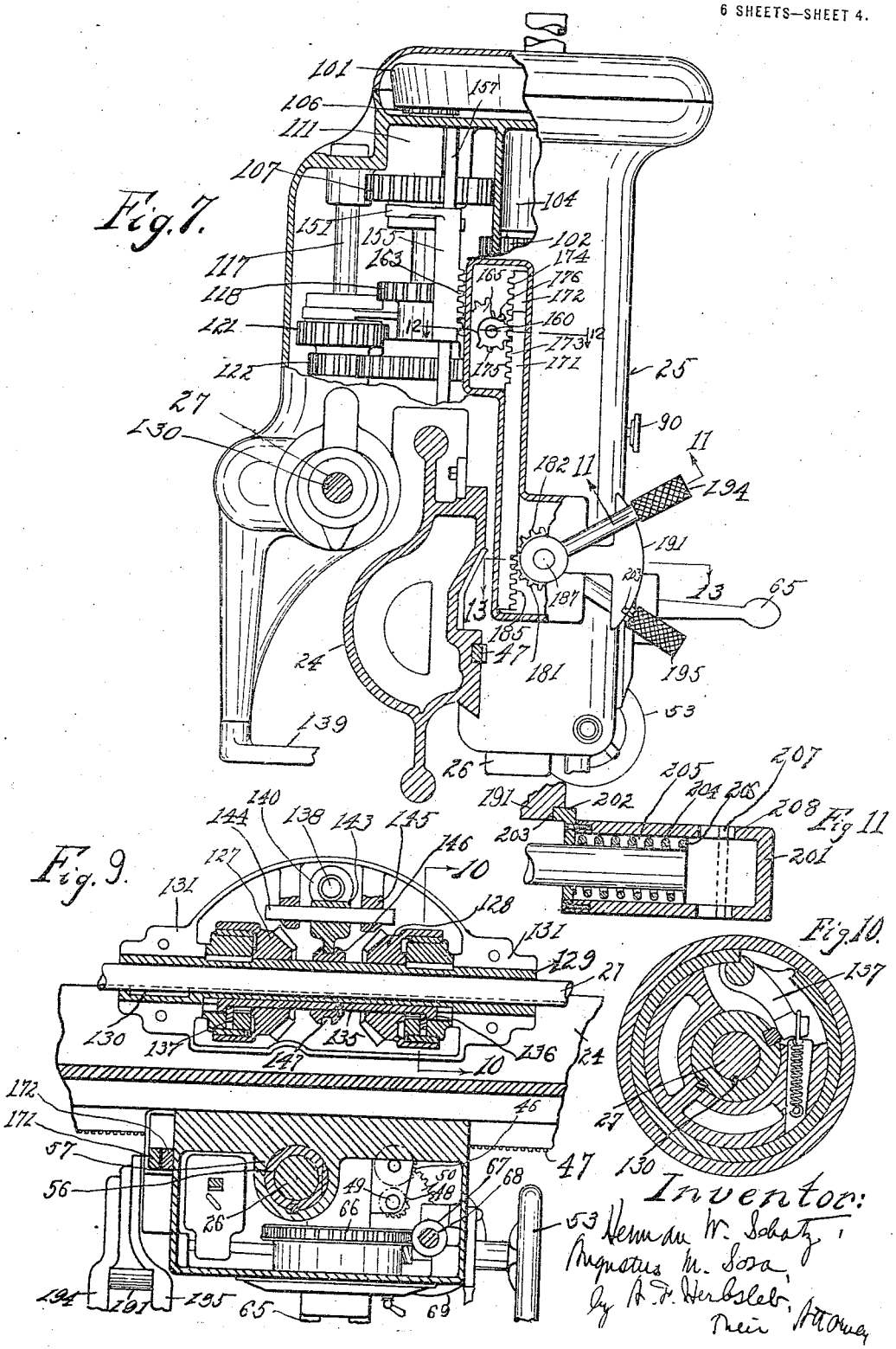

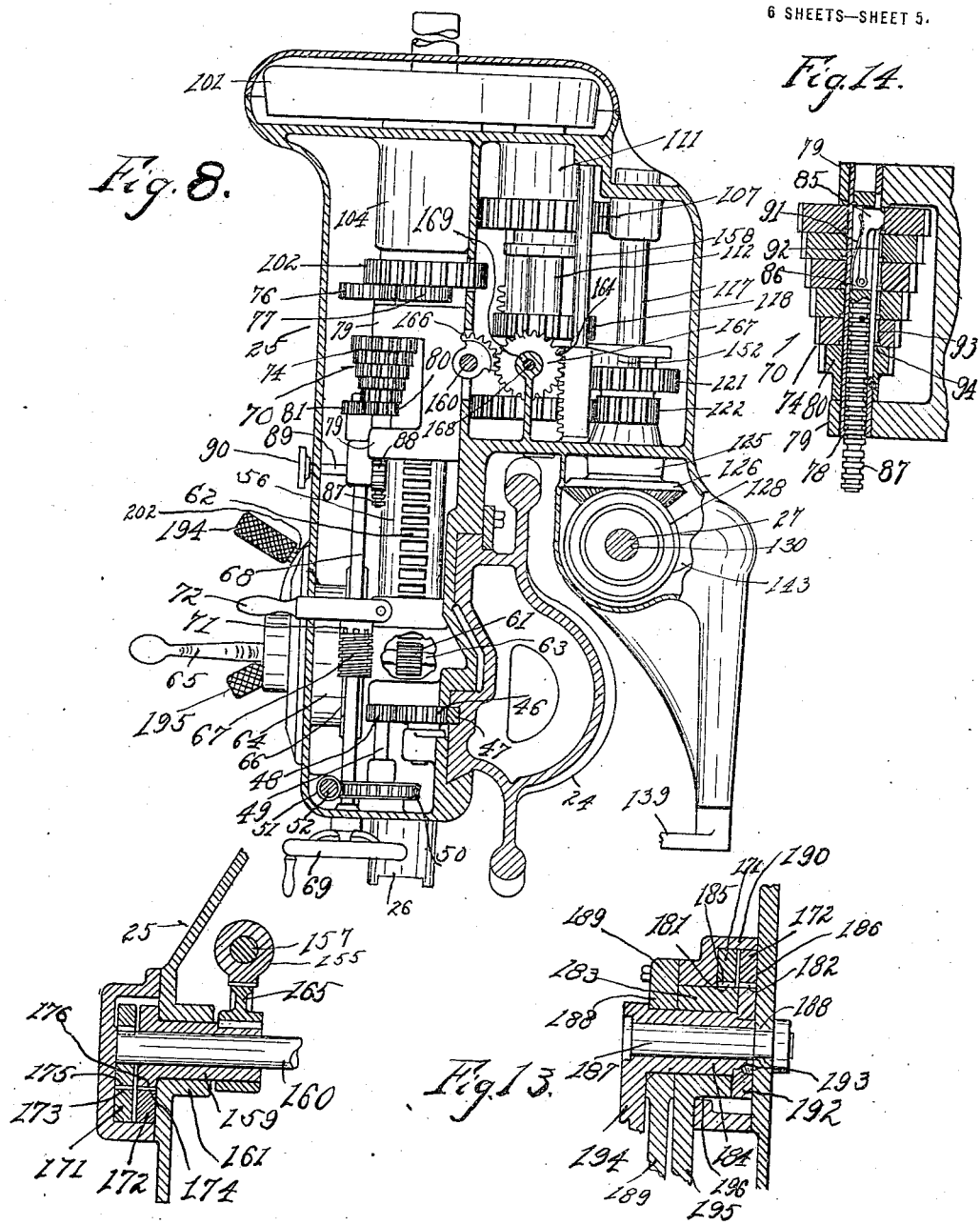

UNITED STATES PATENT OFFICE.

HERMAN W. SCHATZ, OF NORWOOD, AND AUGUSTUS M. SOSA, OF CINCINNATI, OHIO, ASSIGNORS TO THE AMERICAN TOOL WORKS COMPANY, OF CINCINNATI, OHIO, A CORPORATION OF OHIO.

DRILLING-MACHINE.

1,297,256.

Specification of Letters Patent.

Patented Mar. 11, 1919.

Application filed September 10, 1917. Serial No. 190,653.

*To all whom it may concern:*

Be it known that we, HERMAN W. SCHATZ and AUGUSTUS M. SOSA, citizens of the United States, residing, respectively, at Norwood and at Cincinnati, in the county of Hamilton and State of Ohio, have jointly invented certain new and useful Improvements in Drilling-Machines, of which the following is a specification.

Our invention relates to means for driving the drill-spindle of a drilling machine at a plurality of selective speeds. It is the object of our invention to provide novel means whereby a wide range of speeds is obtained for the drill-spindle in manner to avoid excessive variations in the speeds of rotation of the driving gears.

For obtaining the wide variations without excessive variations in speeds of rotation of the driving gears, we employ an internally toothed gear and an externally toothed gear about the axis of rotation of the drill-spindle, and gearing selectively rotating said drill-spindle either by means of said internal gear or said external gear.

It is the object of our invention further, to provide a drilling machine with means for obtaining a variety of low speeds exerting comparatively great leverage upon the drill-spindle for rotating the same, and with means for obtaining a variety of comparatively high speeds, and during such latter speed relation employing the internal gear by means of which the great leverage is obtained, as a fly-wheel for aiding in the rotation and insuring uniformity of speed throughout the range of comparatively high speeds; and, further, to so arrange the elements that the axes of rotation of the driving means for changing from the low speed ratios to the high speed ratios and vice versa, is within the pitch-line of the teeth of the internal gear which acts to produce the fly-wheel effect mentioned.

It is the object of our invention further, to provide means of the character mentioned for rotating and feeding the drill-spindle, so as to provide a wide range of selective speeds for feeding the drill-spindle axially throughout its range of low speed ratios, and throughout its range of high speed ratios.

Instancing the advantages of our invention, it may be stated that if it is desired to impart selective high speeds of rotation to the drill-spindle, employed for instance when using a comparatively small drilling tool or a drilling tool having a light duty to perform, these speeds are imparted to the external gear about the spindle, which is a gear of comparatively small diameter and has a gear of comparatively large diameter operating the same, so that high speeds of rotation may be imparted to the drill-spindle without necessitating excessive speeds of rotation in the variable speed gearing. If it is desired on the other hand, to impart selective low speeds of rotation to the drill-spindle, as when using a large drill or a drill having a heavy duty to perform, these speeds are imparted to the internal gear, which is a gear of large diameter about the drill-spindle, operated by a pinion of comparatively small diameter, preferably having an axis of rotation coincident with the axis of rotation of said gear of comparatively large diameter, so that selective low speeds of rotation may be imparted to the drill-spindle by the same variable speed gearing without excessive variation of speed in said variable speed gearing, the axes of rotation of said comparatively large speed-imparting gear and said comparatively small speed-imparting pinion being located between the pitch-lines of said external gear and said internal gear about the spindle providing a compact arrangement.

The invention will be further readily understood from the following description and claims, and from the drawings, in which latter:

Figure 1 is a front elevation of a drilling machine, embodying our invention.

Fig. 2 is a rear elevation of the same with parts broken away.

Fig. 7 is a left side elevation of the same, the drill-head casing being partly broken away.

Fig. 8 is a right side elevation of the same, with the casing partly broken away.

Fig 9 is a horizontal cross-section of the same, taken in the plane of the line 9—9 of Fig. 6.

Fig. 10 is a detail cross-section of the clutch mechanism, taken in the plane of the line 10—10 of Fig. 9.

Fig. 11 is a detail section of one of the operating arms of the shifting mechanism, taken on the line 11—11 of Fig. 7.

Fig. 12 is a detail of the shifting mechanism, taken in the plane of the line 12—12 of Fig. 7.

Fig. 13 is a detail of the shifting mechanism, taken in the plane of the line 13—13 of Fig. 7.

Fig. 14 is an axial section of the exemplified feed changing means, taken on the line 14—14 of Fig. 5.

Figure 3:
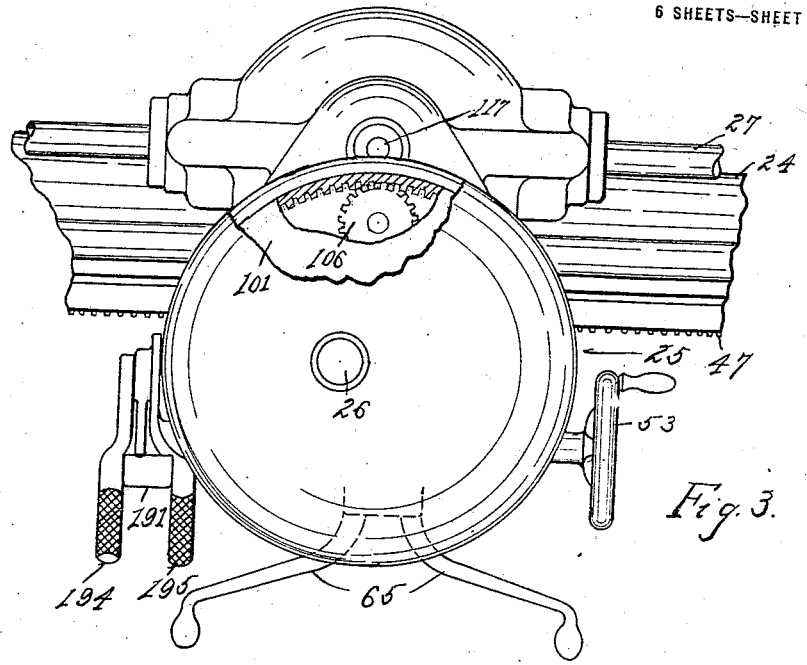
Fig. 3 is a plan view of the drill-head, partly broken away, shown mounted upon the radial drill-arm, partly broken away.

We have exemplified our invention as applied in a radial drilling machine, including the usual base 20, from which a post 21 extends upwardly, a rotatable supporting column 22 being received about the post and supported and adjusted in usual manner. A bearing 23 of a radially extending drill-arm 24 is adjusted up and down upon the supporting column. A drill-head 25 is adjustable lengthwise of the drill-arm, and supports the drill-spindle 26 and its driving and feeding mechanism.

The latter mechanism is actuated by a cross-shaft 27 extending lengthwise of the drill-arm. The cross-shaft is exemplified as driven by a variable-speed drive, which may include a shaft 28 having a step-pulley 29 thereon driven from a suitable source of power. Other speed varying means may be employed, if desired. The power transmitting mechanism between shaft 28 and the cross-shaft of the drill-arm preferably comprises gearing 30 connecting shaft 28 with an upright shaft 31 extending through the post 21, gearing 32 at the top of the column connecting the upright shaft with a shaft 33, extending lengthwise of the supporting column. Bevel-gears 34, 35, respectively having spline-connection with the shaft 33 and fixed to the cross-shaft, rotate the cross-shaft at all elevations of the drill-arm.

A screw-rod 41, selectively driven in reverse directions in usual manner, as by gearing 42 operated by the shaft 31, has threaded connection with a nut 43 on the drill-arm bearing for adjusting the drill-arm to elevation.

Figure 4:
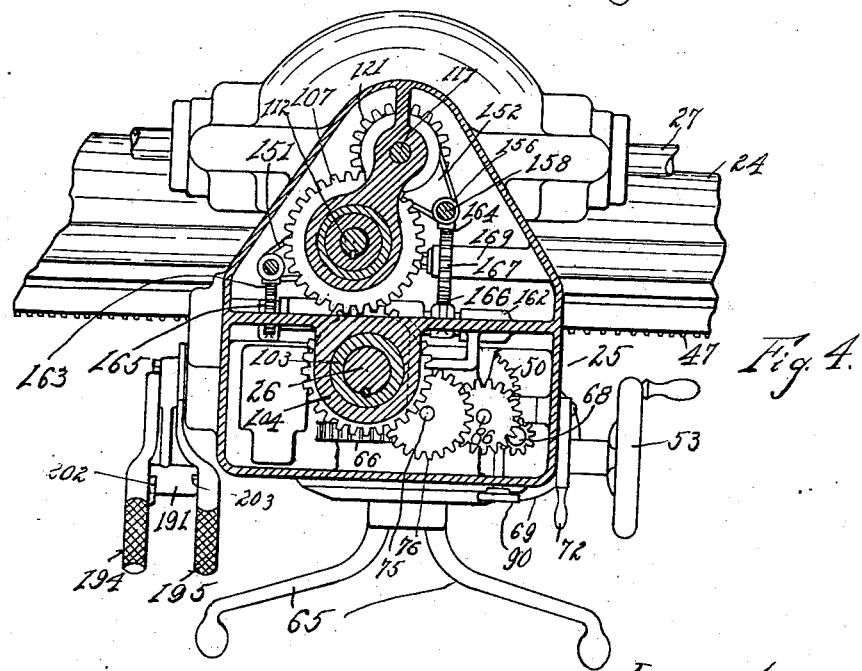
Fig. 4 is a horizontal cross-section of the same, taken in the plane of the line 4—4 of Fig. 6.
Figure 5:
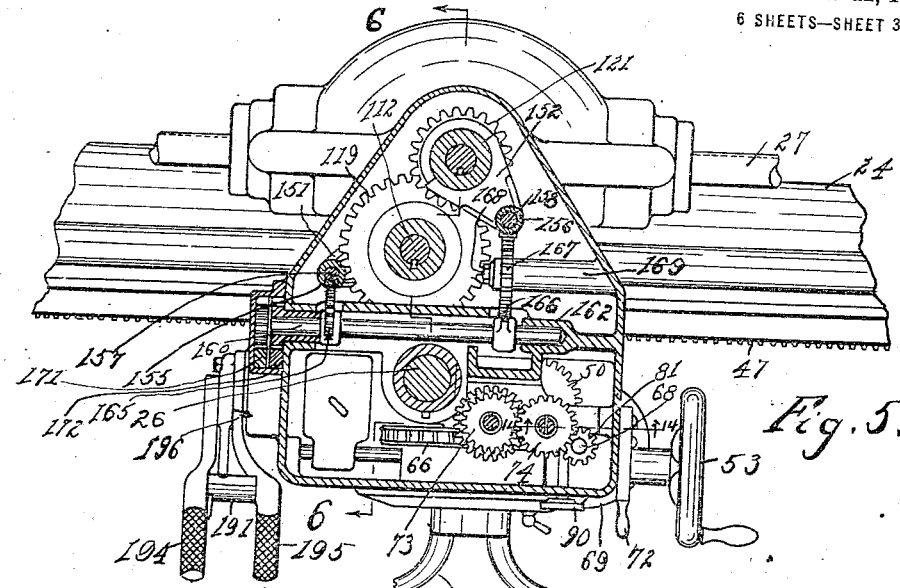
Fig. 5 is a horizontal cross-section of the same, taken in the plane of the line 5—5 of Fig. 6.

The drill-head is exemplified as adjusted lengthwise of the drill-arm and the cross-shaft, (see Figs. 1, 4 and 8), by means of a pinion 46 upon the drill-head engaging a rack 47 extending lengthwise of the drill-arm. The pinion is rotated by a gear 48 on a shaft 49 journaled in the drill-head and having a worm-wheel 50 fast thereon. The worm-wheel is meshed by a worm 51 on a shaft 52 journaled in the drill-head, and operated by a hand-wheel 53.

The drill-spindle is rotatable in a non-rotatable sleeve 56, sliding in a bearing 57 on the drill-head. The sleeve has end-abutment bearings 58, 59, with the drill-spindle. (See Figs. 5, 6, 8 and 9.)

The sleeve is moved axially by a pinion 61 engaging a rack 62 on the sleeve, the pinion being operated by a feed-shaft 63 journaled in the drill-head. The feed-shaft may, through suitable clutch mechanism of usual construction in the casing 64, be either manually rotated by handles 65, or driven by a worm-wheel 66. A worm 67 on a shaft 68 journaled in the drill-head meshes with the worm-wheel.

The shaft 68 is arranged to be driven either by a hand-wheel 69 or by a variable gear set 70, a clutch 71 operated by a handle 72 being arranged to connect the variable gear set with the worm 67, or disengage the same therefrom.

The variable gear set is instanced as comprising a pair of intermeshing nests of gears 73, 74, the nest of gears 73 being on a shaft 75 journaled in the drill-head and having a gear 76 thereon which meshes with a gear 77 about the drill-spindle. The gears of the nest of gears 74, (see also Fig. 14), are relatively loose about a sleeve 78 journaled in bearings 79 on the drill-head, a gear 80 being fast with the sleeve and meshing with a gear 81 fast on the shaft 68. A ducking-key 85 is pivoted on a rod 86 movable up and down in the sleeve, by having a circular toothed rack 87 thereon engaged by a pinion 88 on a shaft 89, (see also Fig. 8), having a handle 90 thereon, for positioning the ducking-key with relation to its gears, which latter are normally loose about the sleeve. The ducking-key is arranged to be pressed by a spring 91 through a slot 92 in said sleeve into key-slots 93 in the respective gears, rings 94 being located about the sleeve between proximate gears for causing disengagement of the ducking-key with said loose gears when the ducking-key is in transverse position to extend into the range of any two of said gears.

The mechanism for rotating the drill-spindle comprises an internal gear 101 and an external gear 102 about the drill-spindle and having axes of rotation coincident with the axis of rotation of the drill-spindle. (See Figs. 3, 6, 7 and 8.) The internal gear is exemplified as of inverted cup shape and provided with an upper substantially close web between the hub and the teeth of the gear. It is shown as fast with a sleeve 103 journaled in a bearing 104 in the drill-head, the drill-spindle having axial movement in the sleeve, fixed rotatably thereto by means of a spline-connection 105. The external gear 102 is also fast with the sleeve. The gear 77 for driving the variable feed for the spindle is also shown fast with this sleeve. Other means of connection may be employed.

The internal gear is shown of comparatively large diameter and is arranged to have variable speed gearing operatively connected therewith for imparting low speed ratios to the drill-spindle, and the external gear is shown of comparatively small diameter and arranged to have variable speed gearing operatively connected therewith for imparting high speed ratios to the drill-spindle, the internal gear preferably acting with a fly-wheel effect upon the rotation of the drill-spindle when the latter is being rotated at its high speed ratios.

A comparatively small driving gear 106, or pinion, is arranged to coact with the internal gear and a comparatively large driving gear 107 is arranged to coact with the external gear, the axes of rotation of said driving gears being preferably located in the space between the cylindrical projections of the pitch-lines of the teeth of the internal gear and external gear.

The driving gears are fast with a sleeve 108 journaled in a bushing 109, the bushing having axial movement by means of a spline-connection 110 in a bearing 111 in the drill-head, the sleeve being rotatable in the bushing, and the bushing and sleeve being axially movable in the bearing for selective engagement of the pinion 106 with the internal gear or of the driving gear 107 with the external gear.

A shaft 112 is journaled in a bearing 113 in the drill-head. The sleeve 108 has spline-connection 114 with said shaft for maintaining driving connection between said shaft and sleeve at the various axial relations between the sleeve and its bushing and the shaft. The pinion 106 may be moved into the bearing 111 when the driving gear 107 is caused to mesh with the external gear.

The shaft 112 is arranged to have various speeds imparted thereto, which are transmitted either to the low-speed or high-speed gearing about the spindle, for imparting variable speeds to either the low-speed or the high-speed gearing. For accomplishing this, a variable-speed driving connection is provided between shaft 112 and a shaft 117. This variable-speed driving connection is instanced as comprising a plurality of spaced-apart gears 118, 119, of different sizes, fixed to shaft 112.

Gears 121, 122, fast with a sleeve 123, are arranged to be selectively brought into meshing relation with the gears 118, 119, as by moving said sleeve lengthwise on the shaft 117, parallel with the shaft 112, said sleeve having spline-connection 124 with said shaft.

The shaft 117 is journaled in bearings 125 in the drill-head and is arranged to be driven in opposite directions. It is provided with a bevel-gear 126 fixed thereto. Bevel-gears 127, 128, are in mesh with the bevel-gear 126 at opposite sides of the latter for selectively rotating said bevel-gear 127 in opposite directions by means of the cross-shaft 27. (See also Figs. 9 and 10.)

The means for selectively engaging gears 127, 128, with the cross-shaft may include a sleeve 129, exemplified as having spline-connection 130 with the cross-shaft, and arranged to be moved lengthwise of the cross-shaft with the drill-head, as by being journaled in bearings 131 on the drill-head. The gears 127, 128, are instanced as loosely mounted upon the rotating sleeve, with suitable clutching means between said sleeve and each of said gears, whereby the gears may be selectively rotated with the sleeve and the cross-shaft, by expanding the clutch-bands of the respective clutches. The clutch-bands are arranged to be selectively expanded by a key 135 having a lever-actuating knob 136 thereon for the lever 137 of each of the clutches. The key is instanced as sliding in a keyway in sleeve 129, and is preferably so arranged that shifting of the key to expand one or the other of the clutch-bands will release the opposite clutch-band so that it may be automatically returned to non-clutching position. The key is shifted axially of sleeve 129 by a manually oscillated rod 138, the operating handle 139 of which is preferably conveniently positioned relative to the position of the operator of the machine.

The oscillating rod is provided with an arm 140 having a roller 141 thereon coacting the opposed walls of a recess 142 of a fork 143 slidable laterally on the shaft 144 in bearings 145 of the drill-head, the fork coacting with a collar 146 in an annular groove 147 of the latter.

The selective driving connections between shaft 112 and the drill-spindle, and between shafts 117 and 112, are preferably independently controlled by mechanism adapted to be manually actuated. (See Figs. 1, 4, 5, 6, 7 and 8.) Instancing this arrangement, the axially movable sleeves 108, 123, of the respective selective driving connections, are preferably adapted to be moved axially by shifting forks 151, 152, received in suitable annular grooves 153, 154, formed in the sleeves 108, 123, respectively. The shifting forks are exemplified as extending laterally from shifting sleeves 155, 156, which are slidably mounted upon guide-rods 157, 158, fixed in the drill-head.

The shifting sleeves are adapted to be independently slid up and down upon their guide-rods by suitable motion transmitting means, preferably actuated by rocking members 159, 160, respectively. (See also Fig. 12.) These rocking members, exemplified respectively as a sleeve, and a shaft upon which the sleeve is rotatably mounted, are instanced as journaled respectively on the drill-head in bearings 161, 162, with their axis of rotation extending transversely of the drill-head. The motion-transmitting mechanism between the rocking members and the shifting sleeves 155, 156, preferably include racks 163, 164, on the shifting sleeves, and sector-gears 165, 166, fixed to the oscillating sleeve and shaft respectively.

The sector-gears are arranged to actuate the racks of the shifting sleeves, either by meshing directly with the racks, as exemplified by gear 165 and rack 163, or through the medium of a transmitting pinion, which is exemplified at 167 as interposed between and meshing with sector-gear 166 and rack 164, at opposite sides of its axis of rotation. The shaft 168 of the transmitting pinion is journaled in a suitable bearing 169. The shifting sleeves are thus adapted to be moved in the desired direction upon their guide-rods, by partially rotating their respective oscillatory actuating members in selective reversible directions.

The oscillatory sleeve and shaft, are preferably independently partially rotated in either direction by reciprocatory members 171, 172, which are instanced as provided with racks 173, 174, in meshing engagement with sector-gears 175, 176, fast upon the shaft and sleeve respectively.

The reciprocatory members are exemplified as actuated by sector-gears 181, 182, which are instanced as rotatable with sleeves 183, 184, and respectively arranged for actuating meshing engagement with racks 185, 186, upon the reciprocatory members. (See also Fig. 13.)

The sleeve 184 is journaled about a stud-shaft 187 secured to the frame and in a bearing 188 of a cover plate 189 of a sleeve-box 190 in which said sleeves are received, the said plate extending forwardly and having an index-plate 191 thereon. Sleeve 183 is journaled about the sleeve 184 and is held thereon by means of a collar 192 secured to the sleeve by a screw 193. The sector-gear 182 is on the collar 192.

An operating arm 194 extends from the sleeve 184 and an operating arm 195 extends from the sleeve 183, the operating arm 195 being received through a slot 196 in said sleeve-box.

Each of the operating arms has an axially movable handle 201 thereon, (see also Fig. 11). The handle is provided with a positioning lug 202 which is normally urged toward recesses 203 in the index-plate 191 by a spring 204 received in the bore 205 of said handle between a shoulder 206 on the operating arm and the bottom wall of said bore. A pin 207 received through the arm and in slots 208 in the handle prevents turning of the handle for insuring coactive relation between the lugs and recesses, which act as stops for positioning the operating arms in relation for causing coaction between the gear elements of the variable-speed and driving means for the drill-spindle.

Figure 6:
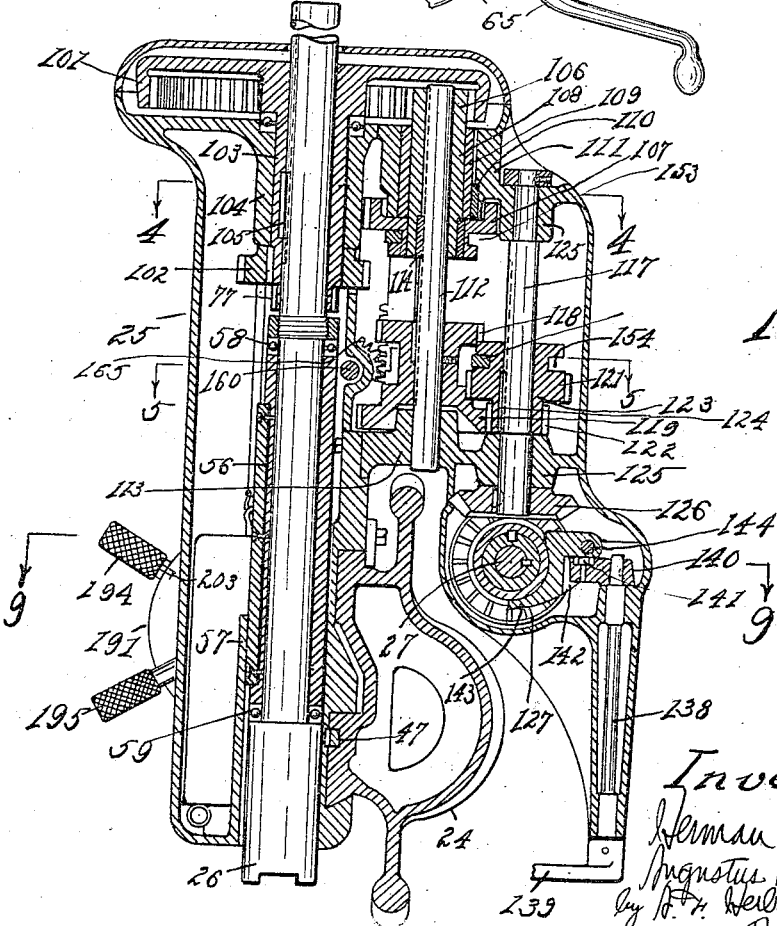
Fig. 6 is a vertical section of the same, taken in the plane of the irregular line 6—6 of Fig. 5.

Referring to Fig. 6, it will be noted that the driving gear 106 meshes with the internal gear at one side of the axes of rotation of the driving gears 106 and 107, and that the driving gear 107 meshes with the external gear about the drill-spindle at the other side of said axes of rotation. If the driving gears rotate in the same direction, this arrangement results in driving the drill-spindle in opposite directions when the respective driving gears are respectively in mesh selectively with the internal gear and external gear about the drill-spindle. In order to effect similarity of direction of rotation when the respective driving gears are selectively in mesh with the internal and external gear about the drill-spindle, the operating arm 139 may be shifted in opposite directions when one of said gears is in mesh, for obtaining a given direction of rotation of the drill-spindle, from the directions in which said operating arm is moved when the other of said driving gears is in operative relation with the gear about the drill-spindle, thus causing opposite rotation of the shaft 117 through the clutches of gears 127, 128, and effecting similarity of direction of driving rotation of the drill-spindle.

Figure 15:
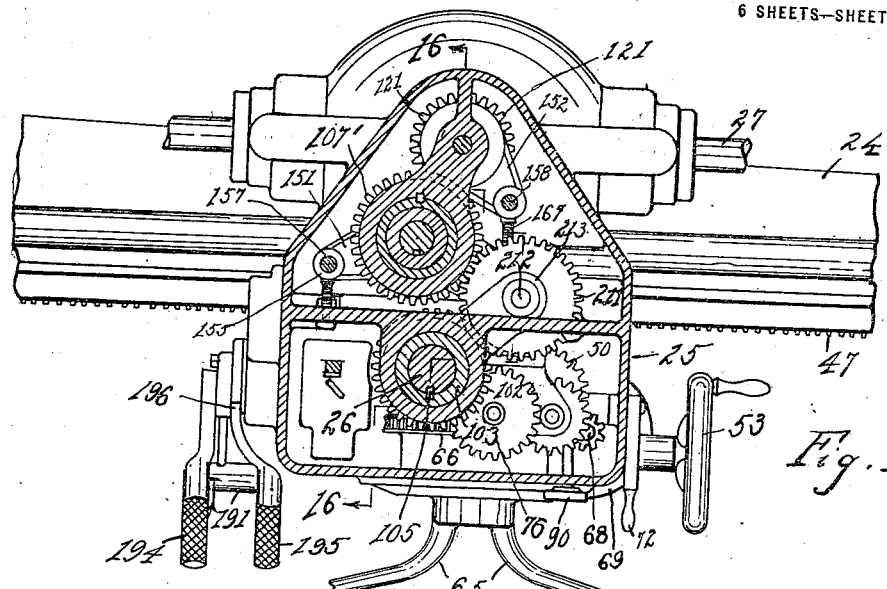
Fig. 15 is a horizontal cross-section taken in the plane of the line 15—15 of Fig. 16, showing a modified form of the invention; and, Fig. 16 is a vertical section of this modification taken in the plane of the irregular line 16—16 of Fig. 15.
Figure 16:
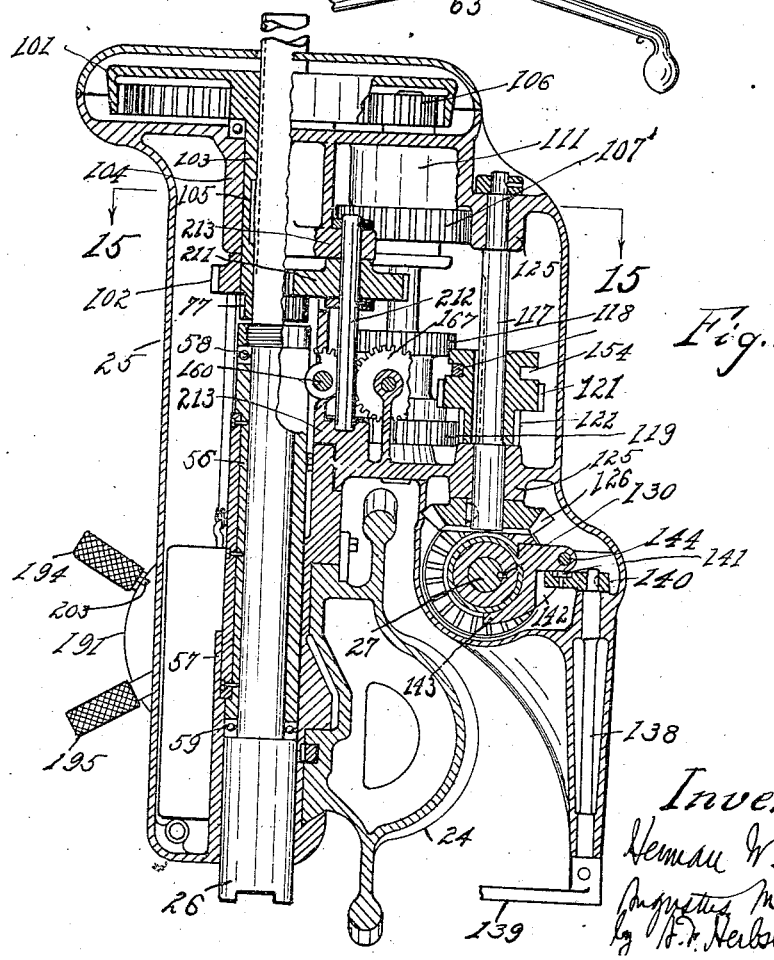

If it is desired to obviate the necessity of thus oppositely shifting the operating lever, an intermediate gear may be interposed between one of said driving gears and one of said gears about the drill-spindle. A modification of the invention of this character is exemplified in Figs. 15 and 16, in which the modified parts are exemplified by similar but primed reference numerals. Thus, (compare Fig. 15 with Fig. 4, and Fig. 16 with Figs. 6 and 8), an intermediate gear 211 is arranged to mesh with the external gear 102 about the drill-spindle, the intermediate gear being on a shaft 212 journaled in bearings 213 in the drill-head. A gear 107' meshes with the internal gear and is fast on the sleeve 108 which is axially movable on the shaft 112.

In operation, assuming that gear 122 is operatively connected with gear 119, and driving gear 106 is operatively connected with the internal gear about the drill-spindle, a low speed ratio of rotation of the drill-spindle, which for example may be instanced as twenty revolutions per minute, is effected. Causing operative connection between the gears 121 and 118, with similar operative connection between the driving gear 106 and the internal gear, the low speed ratio of rotation of the spindle is increased to forty-eight revolutions per minute, being an increase in low speed ratio of 2.4 to 1.

If, on the other hand, the driving gear 107 is caused to mesh with the external gear 102 about the drill-spindle, and the gears 122 and 119 are in coöperative relation, a high speed ratio of rotation of the drill-spindle, which as an example may be instanced as one hundred and twenty revolutions per minute, is imparted to the drill-spindle. If now the gear-sleeve 123 is shifted for engaging the gear 121 with gear 118, this high speed ratio of the drill-spindle is increased to two hundred and ninety-seven revolutions per minute, an increase in high speed ratio of 2.475 to 1, or, when compared with the low speed of twenty revolutions per minute when employing the internal gear for transmitting the speed, a total increase in speed ratio of 14.85 to 1.

These marked differences in speed of rotation of the spindle are effected without material change in the speed of rotation of the speed changing gearing, thereby preventing the necessity of excessive speeds in said speed changing gearing.

When the driving gearing is in operative relation with the external gear about the spindle, the comparatively large internal gear acts with a fly-wheel effect upon the spindle for insuring uniformity of rotation at the high speeds.

These various resultants of speeds are transmitted through the feed gearing into speeds of axial movement of the spindle, the various speeds being multiplied by the speed changes instanced in the feeding mechanism.

The varieties of speeds obtained by the speed changing mechanism in the drill-head may be increased to desired extent by variable speed mechanism at the column, exemplified by the step-pulley 29, although it is obvious that a suitable speed-box, operated by an electric motor, or other speed varying means, may be employed, for increasing the low speed ratios and the high speed ratios respectively of the drill-spindle through the drill-head mechanism.

It is obvious that changes in the speed-varying mechanism may be made within the scope of the appended claims without departing from the spirit of our invention.

Having thus fully described our invention, what we claim as new and desire to secure by Letters Patent, is:

1. In a drilling machine, the combination of a drill-spindle, an internal gear and an external gear about said drill-spindle, and variable speed gearing arranged for operative connection with said drill-spindle through said internal gear and said external gear respectively for selectively causing low-gear ratio effect and high-gear ratio effect upon said drill-spindle.

2. In a drilling machine, the combination of a drill-spindle, an internal gear and an external gear about said drill-spindle for selectively driving the same, driving gears for said internal gear and external gear respectively, and means causing selective driving of said drill-spindle by means of said internal gear and external gear respectively, said driving gears having their axes of rotation within the cylindrical projection of the pitch-line of the teeth of said internal gear.

3. In a drilling machine, the combination of a drill-spindle, an internal gear and an external gear about said drill-spindle for selectively driving the same, said internal gear being of substantially larger pitch-diameter than the pitch-diameter of said external gear, and speed-change gearing having connection with said respective gears between the pitch-diameters thereof for selectively driving said drill-spindle at selective speeds by means of said internal gear or of said external gear.

4. In a drilling machine, the combination of a drill-spindle, an internal gear and an external gear about said drill-spindle, said internal gear being of substantially larger pitch-diameter than the pitch-diameter of said external gear, a driving gear for said internal gear, and a driving gear for said external gear, said first-named driving gear being of substantially less pitch-diameter than the pitch-diameter of said last-named driving gear, and arranged for driving said drill-spindle at substantially different speeds by means of said internal gear and external gear respectively.

5. In a drilling machine, the combination of a drill-spindle, an internal gear and an external gear about said drill-spindle for selectively driving the same, driving gears for said internal gear and external gear respectively, means causing selective driving of said internal gear and external gear respectively by said respective driving gears, said driving gears having their axes of rotation within the cylindrical projection of the pitch-line of the teeth of said internal gear, and variable speed gearing having selective operative connection with said driving gears respectively for multiplying the speeds imparted to said spindle by said internal gear and by said external gear respectively.

6. In a drilling machine, the combination of a drill-spindle, an internal gear and an external gear of relatively greater and less diameters respectively about said drill-spindle for driving the same, and axially movable gearing arranged to be moved into mesh with either said internal gear or said external gear.

7. In a drilling machine, the combination of an axially feedable drill-spindle, an internal gear and an external gear about said drill-spindle for rotating the same, and axially movable gearing arranged to be moved selectively into mesh with said respective internal gear and external gear at opposite sides of the axis of rotation of said axially movable gearing.

8. In a drilling machine, the combination of an axially feedable drill-spindle, an internal gear and an external gear about said drill-spindle for driving the same, variable speed gearing, means for operative connection between said variable speed gearing and said internal gear or external gear respectively, and means for selectively driving said variable speed gearing in reverse directions.

9. In a drilling machine, the combination of an axially feedable drill-spindle, an internal gear and an external gear about said drill-spindle for rotating the same, a pinion arranged for rotating said internal gear, a gear arranged for rotating said external gear, said pinion and gear having coincident axes of rotation, means for selectively rotating said pinion and said last-named gear at selective speeds, and means for causing operative connection between said last-named means selectively through said pinion and last-named gear with said internal gear and said external gear respectively.

10. In a drilling machine, the combination of a drill-spindle, an internal gear and an external gear about said drill-spindle for driving the same, axially movable driving gears arranged to selectively mesh with said internal gear and said external gear at opposite sides of the axis of rotation of said driving gears, and means for driving said axially movable driving gears at different speeds.

11. In a drilling machine, the combination of a drill-spindle, an internal gear and an external gear about said drill-spindle for rotating the same, the pitch-diameter of said internal gear being larger than the pitch-diameter of said external gear, and gears of different diameters having coincident axes of rotation between said pitch-diameters, said last-named gears in train with said gears about said drill-spindle for causing maintenance of similarity of direction of rotation of said drill-spindle when driven by said respective gears thereabout.

12. In a drilling machine, the combination of a drill-spindle, an internal gear and an external gear about said drill-spindle for rotating the same, said internal gear having a larger pitch-diameter than the pitch-diameter of said external gear, driving gears for said gears about said drill-spindle having axes of rotation between said pitch-diameters, and an intermediate gear between one of said gears about said drill-spindle and said driving gears for causing maintenance of similarity of direction of rotation of said drill-spindle.

13. In a drilling machine, the combination of a drill-spindle, an internal gear of comparatively large diameter about said drill-spindle and having a fly-wheel effect thereon for rotating the same, an external gear about said drill-spindle for rotating the same, and speed changing gearing arranged for selective operative connection with said internal gear and said external gear.

14. In a drilling machine, the combination of a drill-spindle, an internal gear of large diameter having a fly-wheel effect upon said drill-spindle located about said drill-spindle for driving the same, an external gear of small diameter about said drill-spindle for driving the same, a small driving gear arranged to mesh with said internal gear, a large driving gear arranged to mesh with said external gear, speed varying means for changing the speeds of said driving gears, and means for selectively operatively connecting said speed varying means through said respective driving gears with said spindle.

15. In a drilling machine, the combination of a drill-spindle, an internal gear and an external gear about said drill-spindle for rotating the same, an upright shaft parallel with said drill-spindle having an axis of rotation within the pitch-line of the teeth of said internal gear, a bearing located between the planes perpendicular to said drill-spindle in which said internal gear and said external gear are respectively located, a sleeve about said shaft in said bearing, a pinion at one end of said sleeve arranged for meshing with said internal gear, a gear at the other end of said sleeve arranged for operative connection with said external gear, and means for shifting said sleeve longitudinally for selective operative relation of said pinion and said gear on said sleeve respectively with said internal gear and said external gear.

16. In a drilling machine, the combination of a drill-head, a bearing therein, a sleeve rotatable in said bearing, a drill-spindle movable axially in and rotatable with said sleeve, an internal gear at the upper end of said sleeve, an external gear at the lower end of said sleeve, and means for driving said internal gear and said external gear at different speeds.

17. In a drilling machine, the combination of a drill-head, a bearing therein, a sleeve rotatable in said bearing, a drill-spindle movable axially in and rotatable with said sleeve, an internal gear at the upper end of said sleeve, an external gear at the lower end of said sleeve, driving gears having axes of rotation between the pitch-diameters of said gears about said spindle, and variable speed means for selectively rotating said driving gears at different speeds.

18. In a drilling machine, the combination of a drill-head, a drill-spindle having axial movement in said drill-head, an inverted cupped internal gear about said drill-spindle, a pinion arranged for meshing therewith, an external gear about said drill-spindle, a gear arranged to mesh therewith, a drive-shaft, and means for causing selective operative connection between said drive-shaft selectively through said pinion and internal gear and through said last-named gear and said external gear for rotating said spindle, said inverted cupped internal gear acting as a fly-wheel upon said drill-spindle during said last-named relation of gearing.

19. In a drilling machine, the combination of a drill-spindle, a pair of parallel shafts parallel with said drill-spindle, axially movable speed change gearing about each of said shafts for imparting multiplied speed variations between said shafts and one of said shafts and said spindle, said axially movable speed change gearing on said last-named shaft including a pinion and a gear, and an internal gear and an external gear about said spindle with which said pinion and gear are arranged to have operative drive connection for rotating said spindle.

20. In a drilling machine, the combination of a drill-spindle, a train of speed change gearing for axially feeding said drill-spindle, an internal gear and an external gear whose axes of rotation are coincident with the axis of rotation of said drill-spindle and arranged for operative connection with said drill-spindle and said speed-change gearing for rotating the same, said internal gear having a larger pitch-diameter than the pitch-diameter of said external gear, drive-gears for said internal gear and external gear having axes of rotation between said pitch-diameters, and variable speed gearing for driving said drive-gears at different speeds.

In testimony whereof, we have hereunto signed our names in the presence of two subscribing witnesses.

HERMAN W. SCHATZ,
AUGUSTUS M. SOSA.

Witnesses:
ALBERT L. JENNINGS,
ALLEN A. EDWARDS.